United States Patent [19]

Touborg

[11] 4,059,392
[45] Nov. 22, 1977

[54] CALCINATION OF PULVEROUS MATERIAL

[75] Inventor: Jorn Touborg, Copenhagen Valby, Denmark

[73] Assignee: F. L. Smidth & Co., Cresskill, N.J.

[21] Appl. No.: 653,025

[22] Filed: Jan. 28, 1976

Related U.S. Application Data

[62] Division of Ser. No. 423,436, Dec. 10, 1973, Pat. No. 3,955,995.

[30] Foreign Application Priority Data

Dec. 11, 1972 United Kingdom ............... 57071/72

[51] Int. Cl.² ............................................ F27B 15/00
[52] U.S. Cl. ..................................... 432/58; 432/106; 432/168
[58] Field of Search .................. 432/58, 106, 168, 169

[56] References Cited

U.S. PATENT DOCUMENTS

| | | | |
|---|---|---|---|
| 3,022,989 | 2/1962 | Pyzel | 432/58 |
| 3,617,037 | 11/1971 | Foch | 432/58 |
| 3,834,860 | 9/1974 | Fukuda | 432/58 |
| 3,881,857 | 5/1975 | Hoy | 432/58 |
| 3,904,353 | 9/1975 | Bosshard et al. | 432/58 |
| 3,925,024 | 12/1975 | Hollingsworth et al. | 432/58 |
| 3,932,117 | 1/1976 | Ritzmann | 432/58 |

*Primary Examiner*—John J. Camby
*Attorney, Agent, or Firm*—Pennie & Edmonds

[57] ABSTRACT

A method of heat treating a preheated, pulverous, raw material consisting of or containing lime, such as cement raw meal. By mixing at least part of the preheated raw material intimately with a fuel capable of carrying out at least a partial calcination, a suspension of raw material in a combustible gas is provided. Upon providing a flow of oxygen-containing gas in contacting relation with the suspension of gas/material, at least a partial calcination takes place according to an endothermic process in which calcium carbonate is dissociated into calcium oxide and carbon dioxide. A finishing calcination and/or other heat treatment may follow the calcination process. When the raw material is cement raw meal, the aforesaid finishing heat treatment following the calcination is a sintering by which cement clinker is produced according to an exothermic process. A unique calcination plant is disclosed for at least partially calcining a preheated pulverous, raw material according to the present method wherein by a supply of heat before the material is subjected to a finishing calcination and/or other heat treatment, if any, at least a partial calcination may be performed approximately isothermically and at a relatively low temperature.

24 Claims, 14 Drawing Figures

FIG. 9
FIG. 10
FIG. 12
FIG. 11
FIG. 13
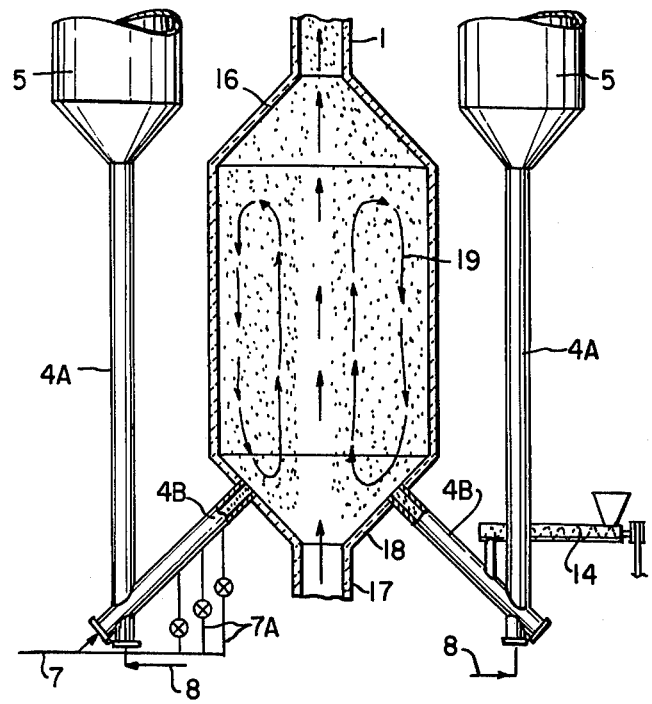
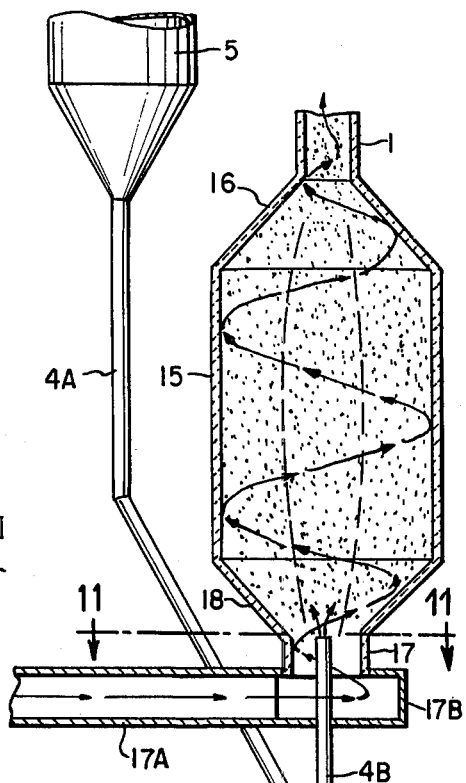
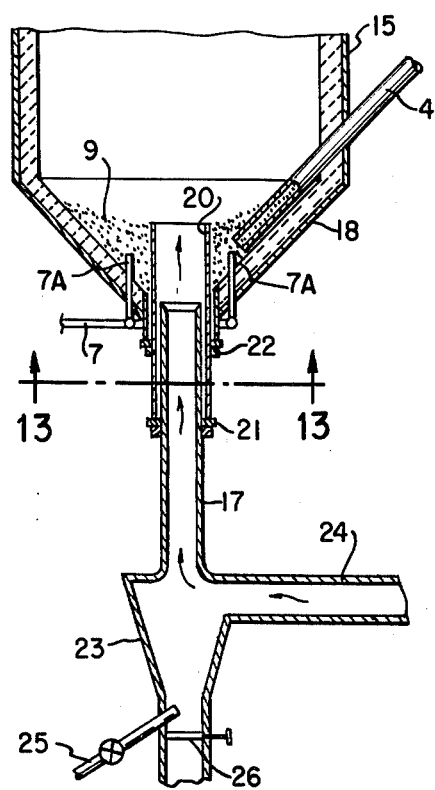
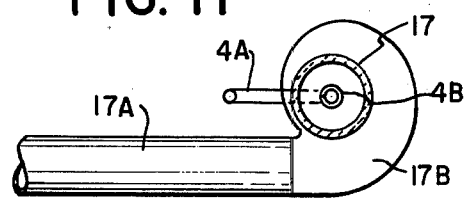
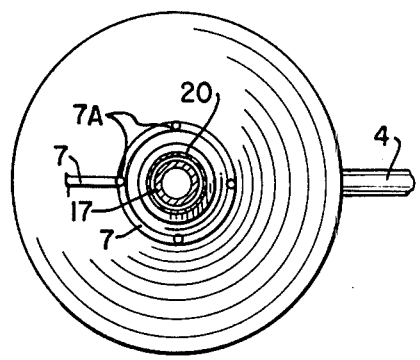

CALCINATION OF PULVEROUS MATERIAL

This is a division of application Ser. No. 423,436, filed Dec. 10, 1973, now U.S. Pat. No. 3,955,995.

BACKGROUND OF THE INVENTION

1. Field of the Invention

This invention relates to calcination of preheated, pulverous, raw material, such as cement raw meal, consisting of or containing lime. The invention relates to an improved method of at least partially calcining such pulverous, raw material and improved calcination plants for treating such raw materials according to the improved method wherein heat is supplied before the material is subjected to any finishing calcination and/or other heat treatment, if any.

2. Description of the Prior Art

Calcination of pulverous raw materials such as cement raw meal is to be understood as an expulsion of carbon dioxide from calcium carbonate by an endothermic process (i.e. a process in which heat is absorbed) according to the equation:

$$CaCO_3 \rightarrow CaO + CO_2$$

When the raw material is cement raw meal, a finishing heat treatment following the calcination is a sintering by which cement clinker is produced. Sintering is an exothermic process characterized by, or formed with, evolution of heat.

The heat necessary for carrying through the conversion of the cement raw meal to cement clinker is usually provided by burning fuel, which together with combustion air, is introduced into a combustion chamber and forms smoke gas. As a result, the energy contained in the fuel is released for heating the smoke gas to a high temperature. The hot smoke gas is then brought into contact with the raw meal to be heat treated. The heat is mainly used for preheating and calcining the raw meal, its sintering being as mentioned an exothermic process; in practice, however, heat must be supplied in order to start the sintering.

Owing, among other things, to the presence of alkalis in the raw meal and the consequent drawbacks it is sometimes preferred to carry through the preheating and calcining of the raw meal by hot gas from one source of heat and the initiation of its sintering by hot gas from another source of heat.

In the case of calcination of cement raw meal it is desirable to carry through this process at a low temperature. However, it is difficult to do that by means of smoke gases having a high temperature since there is then a great risk of excessive heating of the raw meal occurring locally and temporarily. Even excessive heating of a part of the raw meal for a short time may involve expulsion of alkali vapors or the production of melts which may give rise to cakings. Excessive heating of the raw meal at the calcination stage may also prevent chemical reactions intended to take place at a later stage of the whole process for the manufacture of cement clinker. For example, a clinker mineral formation at the stage of the total process at which the calcination is to take place will involve a disadvantageous development of the whole process.

U.S. Pat. No. 3,203,681 to Rosa, et al. relates to a process wherein heat for carrying through the calcination of preheated cement raw meal derives from hot gases having a temperature higher than the calcination temperature. The gases are produced in a separate chamber and are passed upwardly in a riser column in which the raw material is suspended and entrained by the gases thus produced. U.S. Pat. No. 3,452,968 to Shimizu et al. relates to a process for roasting fine ore wherein preheated raw meal and fuel are ejected individually into a rotating flow of gas ascending upwardly in a calcining chamber. Combustion and the roasting reaction are then caused in the violently diffusing turbulent flow. Neither of these prior art patents disclose or suggest a method of heat treating a pulverous, raw material or a plant for practicing the method such as I have invented. According to my invention, a raw material consisting entirely of, or at least containing a portion of, lime is at least partially calcined substantially isothermically (i.e. constant temperature conditions) at relatively low temperatures while substantially eliminating the disadvantages of the presently known systems.

SUMMARY OF THE INVENTION

According to the method of the invention a preheated, pulverous, raw material consisting entirely of, or at least containing a portion of, lime is at least partially calcined. The method comprises mixing at least a part of the preheated raw material intimately with a fuel capable of carrying out at least a partial calcination. The fuel is either a combustible gas itself or, one which is capable of producing a combustible gas upon coming into contact with the preheated raw material. The contacting relation thereby provides a suspension of the raw material in the combustible gas. The method further comprises providing a flow of oxygen-containing gas in contacting relation with the suspension of gas/material in such a manner that the combustible gas burns and the individual particles of raw material are calcined substantially isothermically (i.e. under conditions of substantially constant temperatures) and at relatively low temperatures. The raw material particles thus treated are entrained by the total of exit gases from the combustion and calcination processes and are finally separated from the stream of gases in which they are entrained.

Thus, while presently known methods utilize a fuel to produce a hot stream of smoke gas which is then passed to the raw material to be calcined, the heat is, according to the present invention, generated at the place where the solid particle, which is surrounded by gas, meets the oxygen necessary for the combustion. As far as each particle of raw material is concerned the heat is generated at the place where it is to be used. As a result, the particles of raw material, the oxygen, and the combustible gas, are mixed very intimately so that the calcination may be performed approximately isothermically and at a relatively low temperature.

The use of the expression "partial calcination" results from the fact that the whole cement burning process is often carried through in a manner in which only a partial calcination takes place at the calcination stage, whereas the finishing calcination is effected at the sintering state. It is, of course, also conceivable that the preheated raw meal which is passed to the calcination stage has, in fact, already been subjected to a certain amount of calcination during the preheating stage.

The fuel contemplated by the invention may be either a combustible gas, a liquid fuel such as oil, or a solid, pulverous fuel, such as coal powder. If the fuel is a gas, it is caused to mix intimately with the raw material. In the case of a liquid fuel, when such a fuel is introduced into the raw material, the fuel will evaporate upon meeting the hot raw material and produce a gas which behaves in a similar manner as if combustible gas had been supplied. Solid pulverous fuel has the same effect since it gives off combustible gases when it contacts the hot raw material. These gases then behave in the same manner as the gas which is supplied directly.

In certain cases the process may advantageously be modified by suspending a part of the preheated raw material in the oxygen-containing flow of gas before it is brought into contact with the suspension of gas/material.

Although the intimate mixture of fuel and raw material may be simply discharged into contact with the oxygen-containing gas to provide the contact with the gas/material suspension, there are advantages if an accumulation of an at least partly fluidised mixture of continually supplied fuel and preheated pulverous raw material is formed in a confined space and permitted to serve as a source for continuously providing the gas/material suspension which is to be brought into contact with the flow of oxygen-containing gas. In addition, the combustible gas mixed with the raw material, or the combustible gas formed upon mixture of the fuel with the raw material, will contribute to the at least partial fluidisation of the mixture. If the combustible gas supplied or produced is insufficient for the purpose, a supply of incombustible gas such as atmospheric air, for example, may also be introduced into the mixture. In practice the amount of atmospheric air will be small, and the oxygen content of the air will, therefore, be so small that any combustion of gas that takes place in the accumulation will be without significance.

In those applications in which the raw materials which have been at least partially calcined, are then to be subjected to a finishing calcination and/or other heat treatment, the incombustible gas introduced into the accumulation may be constituted by a part of the gases from the finishing calcination and/or other heat treatment process. This finishing or supplementary heat treatment of the raw material is often succeeded by a cooling of the final product by causing a moving layer thereof to be swept and/or traversed by cooling air in at least one of several known coolers, such as a grate cooler, a separate planetary cooler, or an underlying rotating drum cooler. Since the oxygen-containing gas used in the present invention is preferably atmospheric air which may be preheated to a temperature below the calcination temperature of the raw material, at least part of the used cooling air from the aforementioned cooling process may thus be used in the flow of oxygen-containing gas with which the gas/material suspension is to be brought into contact.

I have found that there are advantages if prior to being brought into contact with the flow of oxygen-containing gas, the preheated raw material passes downwardly and then upwardly along a V-shaped path and the fuel, or fuel and noncombustible gas, is introduced into the material as or after the material passes the lowest point of the path. With this procedure, the mixture downstream of the lowest point of the path is at least partly fluidised and less dense than the material upstream of the lowest point of the path. As a result there is an extensive tendency for the fluidised raw material mixture in the downstream branch of the V-shaped path to rise in that branch whilst the upstream branch of the V-shaped path remains full of unfluidised raw material. This mammoth pump effect produces a very intimate mixing of the raw material and fuel and allows an appreciable saving in the overall height of the construction.

The gas and material suspension may be brought into contact with one or more or all sides of an upwardly flowing stream of oxygen-containing gas. Thus, the suspension may be brought into contact with the outside of the gas stream. Alternatively, the gas/material suspension may be discharged upwardly within an upward flow of oxygen-containing gas. In either case, the gas stream may be exercising a helical swirling action.

Alternatively, a fluidised bed of the raw material may be advantageously utilized in which case the fluidized bed is maintained by introducing into the bottom of the bed, fuel, or fuel and non-combustible gas. In this embodiment the gas in the fluidised bed contributes to the fluidisation of the bed and entrains raw material particles in the space above the bed to form the suspension of gas/material adjacent to the oxygen-containing stream. Thus, there is maintained a liquid-like layer of raw material in the fluidised bed and a gaseous cloud on top of the bed. However, the boundary between them is, of course, not sharply defined. Between them there will be a transitional layer behaving something between a liquid and a gas. The mixture of raw material particles and gas present in this transitional layer may be caused to overflow an edge of the fluidised bed into the stream of oxygen-containing gas. In this case, the flow will be similar to that of a light flowing liquid.

The contact between the gas/materials suspension and the stream of oxygen-containing gas may be caused to take place along an imaginary mutual interface between the media so that the calcination of the raw material particles is at least initiated adjacent to the interface. The particles which are calcined to the greater extent are entrained by the passing oxygen-containing gas stream during calcination and, if desired, after calcination. In still other embodiments of the invention, the fluidised bed may surround or be surrounded by the oxygen-containing gas stream. The amount of material in the bed may then be kept to a minimum and the number of nozzles for the introduction of fuel or fuel and non-combustible gas may be reduced to a single circle of nozzles. In such a case, the fluidised bed may have an annular configuration and the cord of the annulus will have a triangular cross section with its apex downwards.

The invention also pertains to a calcination plant for treating a preheated, pulverous raw material consisting entirely of, or at least containing a portion of lime. Briefly, the plant comprises a conduit having its upper end portion connected to a particle/gas separator with means for passing a flow of oxygen-containing gas through the conduit. A means defines a mixing zone for mixing said preheated raw material and a fuel. The plant further comprises means for separately and continuously feeding fuel and raw material to the mixing zone for intimate mixing thereof to provide a suspension of fuel gas and raw material particles. The mixing zone and the conduit are so arranged in adjacent relation such that the suspension of fuel gas and raw material particles may pass from the mixing zone into contact with the oxygen-containing gas flowing upwardly through the conduit to provide at least a partial calcination of the raw materials.

In a preferred embodiment, the mixing zone is open to a calcination chamber. The conduit is in the form of a shaft, the top of which leads from the calcination chamber to the separator, and the means for passing a flow of oxygen-containing gas upwardly through the shaft is arranged to cause the gas to pass up into the calcination chamber through the bottom of the chamber.

The mixing zone may comprise one or more ducts leading into the calcination chamber with or without fluidisation, or a support arranged to form and maintain a fluidised bed adjacent to the side of the shaft or in the bottom of the calcination chamber as will be seen from the descriptions of the alternate embodiments hereinafter set forth.

BRIEF DESCRIPTION OF THE DRAWINGS

Preferred embodiments of the invention are described hereinbelow with reference to the drawings wherein:

FIG. 9 is a vertical, substantially cross-sectional view of still another modification of the plant of the invention;

FIG. 10 is a vertical, substantially cross-sectional view of still another modification of the plant of the invention;

FIG. 11 is a section taken along lines 11—11 of FIG. 10;

FIG. 12 is a vertical, substantially cross-sectional view of a portion of still another modification of the plant of the invention;

FIG. 13 is a sectional view taken along lines 13—13 of FIG. 12; and

DETAILED DESCRIPTION OF THE PREFERRED EMBODIMENTS

Figure 1:
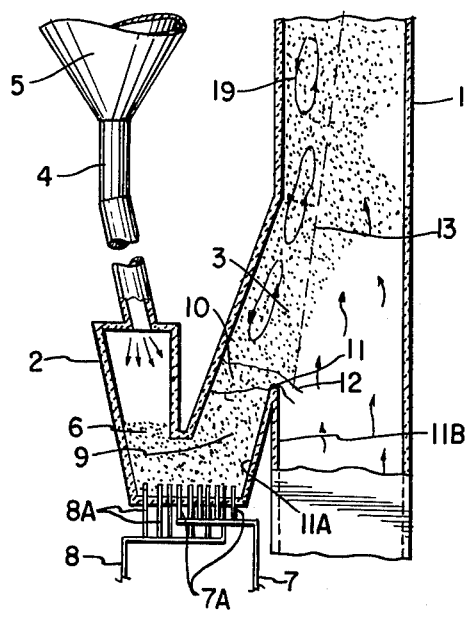
FIG. 1 is a vertical, substantially cross-sectional view of a plant for calcination of cement raw meal according to the invention.
Figure 2:
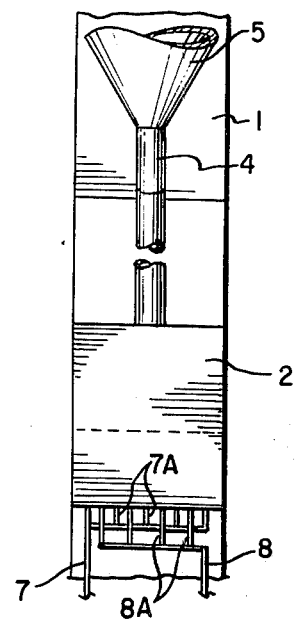
FIG. 2 is a side view of the plant shown in FIG. 1.

The calcination plant illustrated in FIGS. 1 and 2 has a conduit preferably in the form of a shaft 1 of square cross-section which is provided with a fire-resistant lining. During operation an oxygen-containing gas is fed to the shaft 1 from below.

The shaft 1 is associated with a V-shaped chamber 2 in the form of a fluidised bed support and two branches, one of which communicates through an opening 3 with the interior of the shaft. The other branch is connected with a pipe 4 the upper end of which joins the bottom of a cyclone 5, of which only the lower part is indicated in the drawing.

During operation preheated raw meal flows continually from the cyclone 5 through the pipe 4 down into the chamber 2 so as to form and maintain at the bottom of the chamber an accumulation 6 of preheated raw meal.

From the bottom of the chamber 2 the mouths of a number of uniformly distributed pipes 7A project. The other end of the pipes join transverse pipes which unite into a common supply pipe 7. Through the pipe 7 combustible gas or oil is being fed continually to the pipes 7A and hence into the raw meal accumulation 6.

If the feed is gas, this will penetrate that part of the raw meal accumulation that is located in the branch connected with the shaft 1, fluidising the part 9 of the accumulation, whereas the accumulation in the opposite branch will form a seal which effectively prevents the gas from passing up this way and into the pipe 4. As a consequence the fluidised part 9 will rise up the corresponding branch of the chamber 2.

If, however, the feed consists of oil supplied to pipes 7A through the pipe 7, the oil will evaporate when meeting the hot raw meal so that it will now behave as a combustible gas which fluidises that part of the raw meal accumulation which is denoted 9. Thus, the effect is the same, regardless of whether gas or oil is used.

Sometimes it may be found desirable to increase the fluidisation. There is, therefore, a supply pipe 8 for incombustible gas, which, for example, may be atmospheric air. The pipe 8 is branched off into a number of pipes 8A which open uniformly distributed above the bottom of the chamber as shown in FIG. 1. If the supplementary fluidisation is superfluous, the gas supply from the pipe 8 may simply be cut off. Simultaneously with the combustible gas at least contributing to the fluidisation of that part of the raw meal which is denoted 9, the gas also mixes intimately with the part 9. As long as no air or other oxygen-containing gas is fed through the pipe 8, no oxygen will be present in the part 9, and calcination of the raw meal, therefore, cannot take place. If, however, atmospheric air or another oxygen-containing gas is supplied from the pipe 8 through pipes 8A, this will have two effects; one will be that the raw meal seal in the left-hand branch of the chamber 2 is aerated to some extent so that the raw meal will more readily flow from the left-hand branch of the chamber 2. The other effect is that a certain amount of oxygen is introduced into the accumulation of the fuel-mixed raw meal, by which a certain calcination takes place sporadically, which, in itself, is undesirable, but owing to its small extent it is without importance in practice.

Simultaneously with penetrating the part 9 of the accumulation, thereby contributing to fluidise the part 9, the gas flow entrains raw material particles from the accumulation so as to form in the space above the accumulation, and using the accumulation as a source, the suspension of gas and material which by its contact with the passing oxygen-containing gas stream is to cause at least a partial calcination of the individual particles of the suspension. However, the calcination will only take place after the suspension has passed through the opening 3 between the chamber 2 and the shaft 1. The opening 3 is defined downwardly by an edge 11 which is formed where wall portion 11B of the shaft 1 and wall portion 11A of the chamber 2 join each other. Between the part 9 of the accumulation and the space in which the suspension of gas/raw meal is located there will be formed a transitional zone 10 in which the material behaves neither as a liquid nor as a gas, but partakes of the nature of a very lightly flowing liquid. It will overflow the edge 11 and form eddies 12 at this space, and these will at once be caught by the gas ascending through the shaft 1.

As indicated in FIG. 1, the contact between the suspension of gas and raw meal and the stream of oxygen-containing gas takes place along an imaginary boundary surface or boundary zone, denoted 13, between the media. The calcination of the raw meal particles will at least be initiated in the surface or zone 13, in which the particles and the combustible gas meet the oxygen from the oxygen-containing gas, and from which preferably those particles that are calcined to the larger extent are entrained by and, for example, after-calcined in the passing gas. The surface or the zone 13 is inclined, the oxygen of the oxygen-containing gas being consumed as the calcination proceeds, so that the gas will occupy less space. In return, the suspension of gas/raw meal on the left-hand side of the surface 13 will occupy more space since the calcination consists in expelling $CO_2$ gas from the lime of the raw meal.

Figure 3:
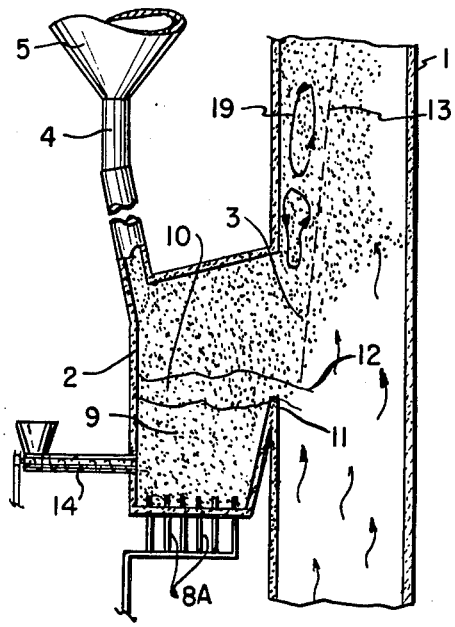
FIG. 3 is a modification of the plant shown in FIG. 1.
Figure 4:
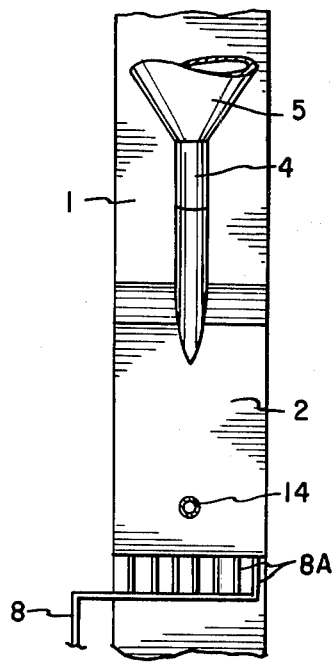
FIG. 4 is a side view of the plant shown in FIG. 3.

Referring now to FIGS. 3 and 4, there is shown a modified plant for calcination of cement raw meal. The plant distinguishes in no essential way from the plant shown in FIGS. 1 and 2, and the reference numerals are, therefore, identical. The principal difference is that in this case the chamber 2 is not branched off into two sections and that there is, therefore, no formation of a seal as described with reference to FIG. 1. In addition, coal power is, as an example, contemplated for use in the calcination. The coal powder is supplied to the fluidised accumulation of raw meal by means of a worm conveyor 14 which forces the coal powder into the accumulation. When the coal powder meets the hot raw meal, combustible gases (carbon monoxide, methane, etc.) are expelled from the coal. When the fuel used is coal, extra fluidisation will usually be required, and also the plant according to FIG. 3 is, therefore, provided with a supply pipe 8 with appertaining pipes 8A and pipe openings for the supply of extra fluidisation gas. The mode of operation of the plant according to FIGS. 3 and 4 is the same as that of the plant first described.

Figure 5:
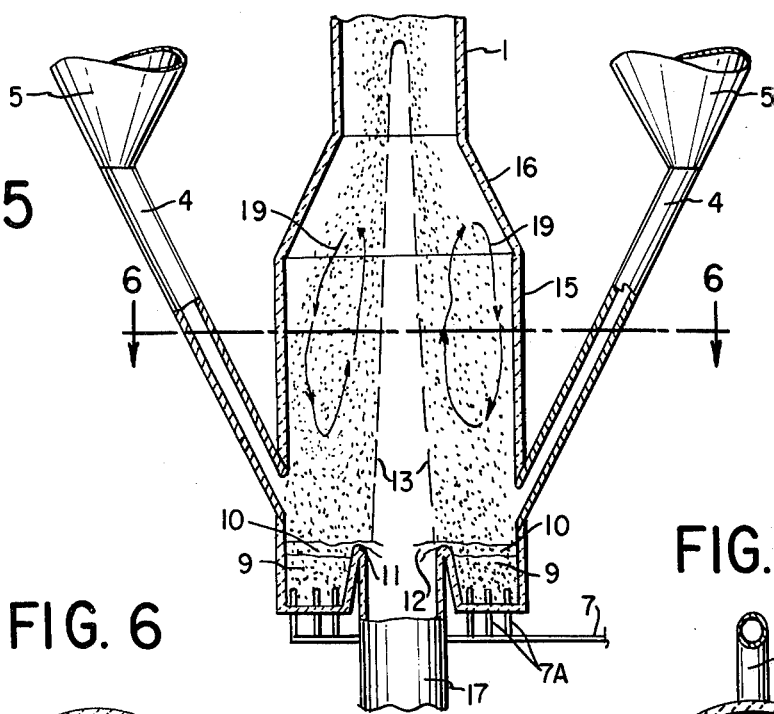
FIG. 5 is another modification of the plant of the invention.
Figure 6:
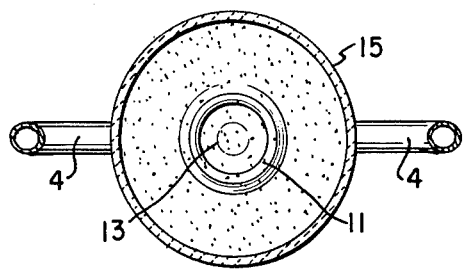
FIG. 6 is a section taken along the line 6—6 of FIG. 5.

FIGS. 5 and 6 show a calcination plant offering substantial advantages above those shown in FIGS. 1 through 4. The structure differs, however, little from those previously described and it has been possible to use the identical reference numerals to a wide extent. The shaft 1 used in this case is not a square, but of circular cross-section as will appear from FIG. 6, and it is provided with a calcination chamber formed by a wider part 15 of an upper portion of the shaft 1, the narrow and the wide parts of the shaft being connected by a part-conical section 16.

The form of the shaft 15 thus presented may be assumed to be arrived at by turning the section which represents the chamber 2 in FIG. 3 through an entire revolution about the axis of symmetry of the shaft 1. As a result, the support for the fluidised raw meal 9 is an annular trough open at its upper end, the egde 11 being annular too. Through the space surrounded by the trough the oxygen-containing gas flows into the shaft 15 through a pipe 17 which corresponds to the lower part of the shaft in FIGS. 1 and 3.

The preheated raw meal is fed to the shaft at two diametrically opposite points, each separately by one of the two cyclones 5 through its separate pipe 4. It will be evident from FIGS. 5 and 6 and the above description that the calcination with the use of the compact plant will be more intense and that the product obtained will be more homogenous than that obtained with the use of the plants previously described. The plane imaginary boundary surface 13 of the latter will, according to FIGS. 5 and 6 of the plant, be an imaginary conical boundary surface. Fundamentally, the mode of operation of the plant is, however, identical to that of the plants previously described.

In FIG. 5, as well as in FIGS. 1 and 3, closed curves in the shaft 1 or its enlargement 15, respectively, indicate the formation of eddy currents 19 by the suspension of gas/material. These eddies have axes of rotation which are substantially horizontal and may cause uncalcined particles to be continually passed to the boundary surface 13 so as to be calcined. In addition, the eddies 19 form a heat insulating cloud protecting the walls of the shaft or the enlargement portion 15 against the heat developed in and around the boundary surface.

Figure 7:
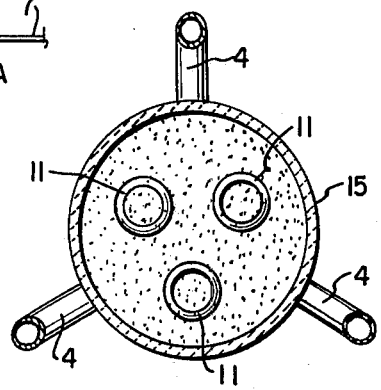
FIG. 7 is a cross-sectional view of still another modification of the plant shown in FIGS. 5 and 6.

Instead of using only one big supply pipe 17 for oxygen-containing gas, there may be a plurality of such smaller pipes mounted symmetrically. This is indicated in FIG. 7, which shows a horizontal, partial cross-sectional view of this embodiment of the plant shown in FIGS. 5 and 6, with the modification that there are three oxygen-containing supply pipes. In FIG. 7 only the upper ends of these pipes are visible in the form of the edge 11. This modification is used with advantage in very large production and provides in that case the suspension of gas and raw meal with increased contact surfaces for meeting the oxygen-containing gas.

Figure 8:
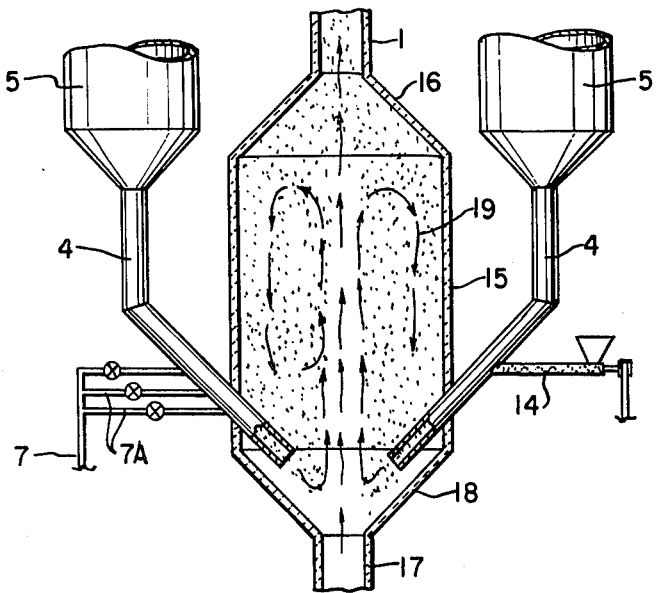
FIG. 8 is a vertical, substantially cross-sectional view of still another modification of the plant of the invention.

The plant shown in FIG. 8 has, like the plant in FIG. 5, a calcination chamber formed by an enlargement 15 interposed between an upper portion 1 and a lower portion 17 of the shaft. However, the parts 15 and 17 are interconnected by a part-conical portion 18. In this example the fluidised bed is eliminated and the intimate mixing between the fuel and raw material takes place in the raw material feed pipes 4 for themselves, of which there may be one, two, or a ring of three or more; however, in FIG. 8 two feed pipes 4 are shown. The fuel is introduced directly into each pipe and FIG. 8 shows by way of example a worm conveyor 14 for coal powder on the right-hand side and, on the left-hand side, a number of separately valved feed pipes 7A connected to common pipe 7 for fuel oil or gas.

Notwithstanding the fact that this construction is simpler than those described so far, a very intimate mixing of the raw material and fuel is achieved. A suspension of gas and raw material is continuously discharged through the lower ends of the pipes 4 downwardly and radially inwardly towards the stream of oxygen-containing gas passing upwards through the centre of the calcination chamber. Also, here the suspension is caused to exhibit eddy currents rperesented by the curved arrows 19 so that a quick calcination is achieved at comparatively low temperature upon contact with the oxygen-containing gas stream. As in the other examples the particles of material, after calcination, are entrained and carried upwards through the upper part 1 of the shaft and are separated in the separator (not shown in FIG. 8).

The FIG. 9 modification differs from the modification of FIG. 8 in that the raw material feed pipes 4 are V-shaped having an upstream branch 4A and a downstream branch 4B. The fuel is introduced into the branch 4B and the fuel gas so introduced together, if necessary, with some incombustible gas introduced through pipes 8 at the lowest point of the V-shaped pipe, causes fluidisation of the raw material within the branch 4B. The raw material in the branch 4A forms a seal and a mammoth pump effect is produced similar to that in FIG. 1 whereby the mixture of raw material and fuel naturally rises through the branch 4B into the bottom of the calcination chamber. The advantages of particularly good mixing of raw material and fuel and the consequent efficient low temperature calcination are again obtained, together with that of a fast feed rate through the pipe 4 and the possibility of reducing the overall height of the equipment.

The modification illustrated in FIGS. 10 and 11 differs from the example of FIG. 9 in that the downstream branch 4B of the raw material feed pipe leads vertically and centrally up into the bottom of the calcination chamber 15 surrounded by the oxygen-containing supply pipe 17. Again, the fuel, with some incombustible gas, if necessary, is introduced into the bottom of the branch 4B through pipes 7, 8. In this example the oxygen-containing gas supply pipe 17 is fed laterally through a branch 17A which leads into a vortex producing manifold 17B which causes the gas to exercise a helical swirling action as it passes up through the chamber 15 as indicated by the arrowed line.

In this case eddy currents like those indicated by the curves or arrows 19 in the modifications shown in the previous Figures will not be formed, but the helical swirling motion of the gas will have the same effect as the eddies, although their common axis of rotation is vertical in this case instead of horizontal.

The example illustrated in FIGS. 12 and 13 utilizes a calcination chamber similar to that of FIGS. 8 to 11 but, like FIG. 5, an annular fluidised bed 9 is formed in the bottom of the chamber and is fed with raw material through a pipe or pipes 4. Owing to the part-conical shape of the bottom part 18 of the chamber, and an upwardly extending mouth 20 of the lower shaft portion 17 and corresponding to the edge 11 in FIG. 5, the fluidised bed has a triangular cross-section. This is a particularly efficient construction enabling efficient and quick calcination at low constant temperature to take place without the addition of any non-combustible fluidising air being necessary and with the use of only a single ring of oil feed pipes 7 for introducing the fuel through pipes 7A to be vaporized for fluidisation and combustion. Further, only comparatively small amounts of fluidised material need be maintained in the calcination chamber.

The mouth 20 is telescopically retractable downwards relatively to the lower part 17 of the shaft. The mouth 20 is sealed to the shaft 17 by sliding seals 21 and sealed to the calcination chamber by sliding seals 22. The advantage of this is that by lowering the mouth 20 slightly, the fluidised bed 9 can be caused partly and continuously to overflow the edge of the mouth with a weir effect into the oxygen-containing gas stream, similar to the examples in FIGS 1, 3 and 5.

A further advantage is that by lowering the mouth 20 until its upper edge is level with the bottom of the calcination chamber, the material in the fluidised bed is free to pour out of the bottom of the calcination chamber and down the shaft 17 into a hopper 23 forming a collecting chamber. This operation is carried out during a temporary stoppage when lumps of raw material or foreign bodies have settled in the fluidised bed. The mouth 20 is then raised again and operation is recommenced.

The material in the hopper 23 does not affect the supply of oxygen-containing gas up through the shaft 17 to the calcination chamber as the oxygen-containing gas supply is provided through a lateral pipe 24 which leads into the shaft 17 above the funnel 23. A blow pipe 25 leads into the funnel for use in blowing fine particles back up into the calcination chamber again. Lumps or foreign bodies then remaining in the funnel are removed, after cooling, by opening a damper 26.

Figure 14:
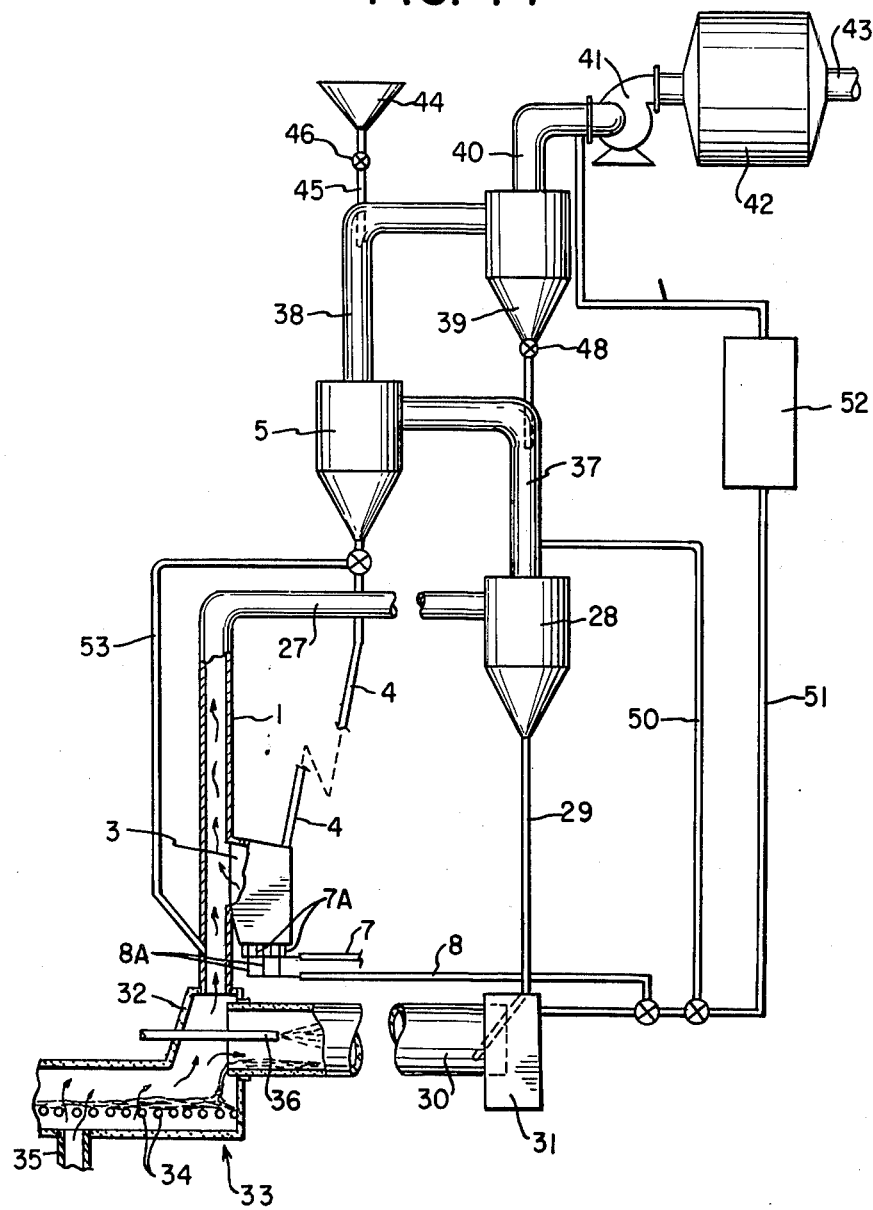
FIG. 14 is a diagrammatic representation of a complete cement burning plant incorporating by way of example, the calcination plant of FIG. 3, but which may incorporate any of the modifications of the plants shown in the other Figures.

FIG. 14 shows diagrammatically a complete cement burning plant, in which the calcination plant according to FIG. 3 constitutes an integral part. The plant according to FIG. 14 is assumed to be oil-fired; however, it should be emphasized that the other illustrated calcination plants could equally well be substituted. In this Figure there are shown certain numerals which are identical to those shown in the previous Figures and which are used to identify corresponding components. The shaft 1, the chamber 2, the opening 3, and the supply pipe 4 for preheated raw meal, and the entire cyclone 5 are shown. The supply pipe 7 for feeding oil to pipes 7A and the supply pipe 8 for feeding supplementary fluidising gas are also shown, as the edge 11. fluidising gas are shown, as well as the edge 11.

The upper end of the shaft 1 joins a horizontal pipe 27 through which the suspension of wholly or partially calcined raw meal is passed tangentially into a cyclone 28, in which gas and raw meal are separated from each other. The raw meal sinks through a pipe 29 directly down into a rotary kiln 30, in which the wholly or partially calcined raw meal is finish-calcined, if necessary, and burnt to cement clinker. The raw meal inlet end of the rotary kiln 30 is surrounded by a casing 31, and a similar casing 32 is located at the other end of the rotary kiln. The casing joins at its lower end a clinker cooler 33 of the grate type. This has a grate 34, onto which the clinker falls and along which the clinker is advanced from the right to the left, and cooled by a transverse current of air supplied through a pipe 35. Having passed the clinker layer, the air enters the casing 32 to the top of which the shaft 1 is connected, so that part of the used cooling air enters it and constitutes the oxygen-containing gas previously referred to. Another part is sucked into the rotary kiln 30 so as to serve as secondary combustion air for the formation of a flame at the end of a burner pipe 36 extending into the kiln, in which the sintering of the preheated and calcined raw meal takes place. The clinker cooler 33 need not necessarily be of the grate type to serve as a source of oxygen-containing gas to be supplied to the bottom of the shaft 1. Other types such as an independently rotating planetary cooler or an underlying rotating drum cooler might just as well be used.

In the cyclone 28 the wholly or partially calcined raw meal is separated from the gas in which it was suspended. The gas leaves the top of the cyclone through a riser pipe 37 which opens tangentially into the cyclone 5 previously referred to and which constitutes one cyclone of a two-stage cyclone preheater. From the top of the preheater a riser pipe 38 leads to the other cyclone, denoted 39. From the top of the cyclone again a pipe 40 leads to the suction side of a fan 41, which produces the sub-atmospheric pressure that causes atmospheric air to be drawn in through the intake 35, the air then flowing along the path indicated by the reference numerals 35-32-1-27-28-37-5-38-39-40-41. The fan 41 forces the gas into an electrostatic dust precipitator 42, in which the dust carried by the gases is separated off, and the cleaned gas leaves the precipitator through a pipe 43 leading to a vent (not shown).

The raw meal to be preheated in the cyclone preheater 37, 5, 38, 39, calcined in the shaft 1 and subsequently burnt to cement clinker in the rotary kiln 30, in order finally in the form of clinker to be cooled in the cooler 33, is passed to a hopper 44. The hopper 44 opens into a pipe 45 which contains a sluice 46, e.g. a gate valve of suitable design, which permits the raw meal to pass vertically down through the pipe 45, but prevents any passage of gas therethrough. The pipe 45 opens at some point further down in the vertical part of the riser pipe 38, where the raw meal meets the ascending stream of gas through the pipe, by which the raw meal is entrained and heated by the gas stream, whereas the gas itself is cooled.

In accordance with the principle known from cyclone preheaters the raw meal together with the gas is introduced into the cyclone 39, in which the two media are separated from each other, the gas as previously described ascending through the pipe 40, whereas the raw meal passes through a pipe 47 containing a sluice 48 of the identical kind as that denoted 46 into the interior of the riser pipe 37 near its lower end. As a result, the raw meal will be preheated still more, since the gas it meets in the riser pipe 37 is warmer than the gas flowing through the riser pipe 38. In the cyclone 5 the two media are again separated from each other, the gas as previously referred to passing up through the pipe 38, whereas the now finish-preheated raw meal is introduced through the pipe 4 into the chamber 2, in which it is treated as previously described and subsequently calcined in the shaft 1, with which the chamber 2 communicates.

It is worth observing again that the calcination and the preheating of the raw meal are not, as is conventionally the case, carried through by means of hot rotary kiln gases with the consequent drawbacks previously described, but by means of atmospheric air and fuel mixed with the raw meal. The exit gases from the sintering process performed in the rotary kiln 30 must, however, be disposed of in other manner, and preferably so that the heat contained therein may be utilized. The possibilities hereof are illustrated by additional pipelines in FIG. 14.

If extra fluidization of the raw meal in the chamber 2 is required, a part of the exit gases from the rotary kiln 30 may be used for this purpose such as indicated by the pipeline 8.

The remainder of the gases or the whole of the amount of gas may either follow the pipeline 50; that is, it may be introduced into the riser pipe 37 of the lower cyclone; or it may, following the pipeline 51, be introduced into the gas stream directly in front of the blower 41, as shown. In the latter case the heat of the exit gases will not, however, be utilized. On the contrary, it will often be necessary as indicated in the Figure to let the gases pass through a cooling tower 52. In this the gases are cooled before they enter the electrostatic precipitator 42, which cannot stand up to the passage of gas exceeding a certain temperature. Further, it would be unsatisfactory if the gas does not contain a certain amount of moisture. Moisture will automatically be added to it in the cooling tower 52.

Furthermore, in FIG. 14 there is indicated quite diagrammatically by means of the pipeline 53 a means whereby a part of the preheated raw meal may be fed to the bottom of the shaft 1, such that this part of the raw meal together with the oxygen-containing gas is passed up through the shaft. This is an alternative to passing the raw meal through the pipe 4 into the chamber 2 to be mixed with the fuel as previously described.

The overall height advantage which can be achieved by the V-shaped material feed pipe 4A and 4B in FIG. 9 may be appreciated by considering substitution of the FIG. 9 calcination plant in FIG. 14. In that case the upper end of each pipe branch 4B could be connected to the bottom of the shaft 1 in FIG. 14 so that the shaft 1 may be made shorter with a consequent possibility of lowering the level of parts 28, 5, 39 and 42, that is to say the whole of the plant. The bend at the interconnection of the branches 4A and 4B may then be located on a level with the mouth of the pipe 35 or even lower still. The other branch 4A being connected to the pipe 4.

I claim:

1. A calcination plant for treating a preheated, pulverous raw material consisting entirely of, or at least containing a portion of, lime comprising a conduit, means for passing a flow of oxygen-containing gas upwardly through said conduit, a mixing chamber positioned adjacent said conduit defining a mixing zone for mixing preheated raw material and a fuel, means for separately and continuously feeding fuel and preheated raw material to said mixing zone for accumulating and substantially and uniformly intimately mixing said fuel and preheated raw material prior to calcination to provide a suspension of a fuel gas and raw material particles, said mixing zone being positioned adjacent said conduit and communicating therewith such that the suspension of fuel gas and raw material particles are drawn from said mixing zone into said conduit by said flow of oxygen-containing gas so as to contact the oxygen-containing gas flowing up through said conduit to become entrained by said oxygen-containing gas to provide at least a partial substantially isothermal calcination of said raw material particles by the contact of the uniformly mixed preheated raw material and fuel with the oxygen-containing gas.

2. The plant according to claim 1, wherein said chamber defining said mixing zone is open to a calcination chamber and said conduit is in the form of a shaft which extends at least from the upper portion of said calcination chamber to a particle/gas separator, said means for passing a flow of oxygen-containing gas upwardly through said shaft being in the form of a fan connected downstream of the calcination chamber in the direction of gas flow.

3. The plant according to claim 2 wherein said chamber defining said mixing zone comprises at least one upwardly extending duct having an upper end portion open into the lower portion of said calcination chamber and a lower end portion adapted to be fed from above by said raw material feed means, said fuel feed means being positioned relative to said upwardly extending duct to feed fuel into said duct downstream of its lower end such that intimate mixing of the raw material and fuel takes place in said duct.

4. The plant according to claim 3 wherein at least one duct is positioned and configured to open into the lower portion of the calcination chamber and said inlet for said oxygen-containing gas is arranged to surround said duct.

5. The plant according to claim 1, wherein said chamber defining said mixing zone is in the form of a support means which is configured to form and maintain a fluid bed support for raw material and a fuel supply pipe extends through the bottom portion of said support and provides fuel which is mixed with said raw material in said fluid bed, said fluid bed support further having an upper portion which opens into said oxygen-containing gas conduit.

6. The plant according to claim 2 wherein said chamber defining said mixing zone is in the form of a support means which is configured to form and maintain a fluidised bed of raw material and a fuel supply means extends through the bottom portion of the support means and provides fuel which is mixed intimately with said raw material in said support means, said support means further having an upper portion which opens into said oxygen-containing gas shaft.

7. The plant according to claim 6 wherein said fluidised bed support is formed in the bottom portion of said calcination chamber and means for ducting the oxygen-containing gas is configured and positioned to supply said gas upwardly through the central portion of said support means.

8. The plant according to claim 6 wherein said fluidised bed support is formed in the bottom portion of said calcination chamber and means for ducting the oxygen-containing gas is configured and positioned to supply said gas into the calcination chamber and around said support means.

9. The plant according to claim 7 wherein said fluidised bed support has an annular configuration and is formed in the lower portion of the calcination chamber surrounding the upper portion of a portion of the shaft for passing the flow of oxygen-containing gas which extends upwardly and centrally through the bottom wall of the calcination chamber.

10. The plant according to claim 9 wherein the bottom wall of the calcination chamber has a frusto-conical configuration and slopes downwardly and inwardly in relation to the lower portion of the oxygen-containing gas shaft.

11. The plant according to claim 7 wherein the upper portion of the lower portion of the shaft is retractable downwardly thereby providing adjustability in the height in which said shaft extends into said calcination chamber.

12. The plant according to claim 8 wherein the upper portion of the lower portion of the shaft is retractable downwardly thereby providing adjustability in the height in which said shaft extends into said calcination chamber.

13. The plant according to claim 9 wherein the upper portion of the lower portion of the shaft is retractable downwardly thereby providing adjustability in the height in which said shaft extends into said calcination chamber.

14. The plant according to claim 10 wherein the upper portion of the lower portion of the shaft is retractable downwardly thereby providing adjustability in the height in which said shaft extends into said calcination chamber.

15. The plant according to claim 10 wherein the upper portion of the lower gas shaft portion is retractable to a position at which its upper end is substantially level with the bottom of the calcination chamber such that lumps of raw material or foreign bodies settling in the fluidised bed during stoppage of the plant can be caused to drop from the calcination chamber down through the shaft to a collecting chamber at the bottom of said shaft.

16. The plant according to claim 14 wherein the upper portion of the lower gas shaft portion is retractable to a position at which its upper end is substantially level with the bottom of the calcination chamber such that lumps of raw material or foreign bodies settling in the fluidised bed during stoppage of the plant can be caused to drop from the calcination chamber down through the shaft to a collecting chamber at the bottom of said shaft.

17. The plant according to claim 2 wherein said mixing zone comprises at least one downwardly and inwardly extending duct having a lower end portion open into the lower portion of the calcination chamber and an upper end portion adapted to be fed from above by said raw material feed means, said fuel feed means being positioned relative to said downwardly extending duct and adapted to feed fuel into said duct downstream of the fuel feeding means and upstream of the location wherein the duct opens into the chamber such that intimate mixing of the raw material and fuel takes place in said duct prior to being introduced into said calcination chamber.

18. The plant according to claim 17 wherein a plurality of said downwardly extending ducts are positioned relatively radially of said calcination chamber.

19. An apparatus for calcining preheated, pulverous raw material consisting of, or at least containing a portion of, lime comprising a pipe having its upper end portion connected to a particle/gas separator, a fan for directing a flow of oxygen-containing gas through said conduit, a mixing chamber positioned adjacent said pipe and defining a mixing zone having wall portions extending generally upwardly and adapted to accumulate preheated raw material and a fuel so as to permit intimate mixing thereof, means for separately and continuously feeding fuel and preheated raw material to said mixing zone in relative directions so as to accumulate and substantially uniformly intimately mix said fuel and preheated raw material prior to calcination to provide a suspension of a fuel gas and preheated raw material particles, said mixing chamber opening into said pipe so as to communicate said mixing zone therewith such that the suspension of fuel gas and raw material particles are drawn from said mixing zone and entrained by said oxygen-containing gas to thereby provide at least a partial, substantially isothermal and uniform calcination of said raw material particles by the contact of the uniformly mixed preheated raw material and fuel with said oxygen-containing gas.

20. An apparatus for calcining preheated, pulverous raw material consisting of, or at least containing a portion of, lime comprising a chamber having its upper end portion connected to a particle/gas separator, a pipe communicating with the lower end portion of said chamber and a fan for directing a flow of oxygen-containing gas through said calcination chamber, the lower portion of said calcination chamber surrounding the upper end portion of said oxygen-containing gas pipe defining an annular mixing zone having wall portions adapted to accumulate and mix preheated raw material and a fuel, means for continuously feeding preheated raw material to said mixing zone, means for feeding fuel to said mixing zone so as to accumulate and substantially uniformly intimately mix said fuel and preheated raw material prior to calcination to provide a suspension of fuel gas and preheated raw material particles, said mixing zone being positioned adjacent to said oxygen-containing gas pipe and in such relation that the suspension of fuel gas and raw material particles are drawn from said annular mixing zone and entrained by said oxygen-containing gas to thereby provide at least a partial, substantially isothermal and uniform calcination of said raw material particles by the contact of the uniformly mixed preheated raw material and fuel with said oxygen-containing gas.

21. The plant according to claim 20 wherein at least one duct opens centrally into the bottom of the calcination chamber and is concentrically surrounded by a central inlet for the flow of oxygen-containing gas.

22. The plant according to claim 21, wherein said oxygen-containing gas conduit is positioned tangentially to and offset from the axis of the corresponding inlet to said calcination chamber.

23. An apparatus for calcining preheated, pulverous raw material consisting of, or at least containing a portion of, lime comprising a chamber having its upper end portion connected to a particle/gas separator, a pipe communicating with the lower end portion of said chamber and a fan for directing a flow of oxygen-containing gas through said calcination chamber, at least two conduits communicating with the lower end portion of said calcination-chamber to direct intimately mixed preheated raw material and fuel in a downward direction into said calcination chamber, said conduits being adapted to accumulate and mix preheated raw material and a fuel therein prior to being fed to said calcination chamber for calcination, said conduits further being positioned sufficiently adjacent the upper end portion of said oxygen-containing gas pipe such that the intimately mixed preheated raw material and fuel are drawn into the upward flow of oxygen-containing gas so as to be entrained and contacted by said oxygen-containing gas to provide at least a partial substantially isothermal calcination of said raw material particles by the contact of uniformly mixed preheated raw material and fuel with the oxygen-containing gas.

24. An apparatus for calcining preheated pulverous raw material consisting of, or at least containing a portion of, lime comprising a calcination chamber having its upper end portion connected to a particle/gas separator and a lower end portion connected to a particle/gas separator and a lower end portion having inwardly sloping wall portions, a pipe communicating with the lower end portion of said chamber for directing a flow of oxygen-containing gas into and through said calcination chamber, said pipe being telescopically retractable inwardly and outwardly with respect to said calcination chamber to provide adjustability in the portion of the pipe extending into the calcination chamber and defining a variable weir and annular mixing zone with said sloping lower wall portions of said calcination chamber, at least one conduit communicating with the lower end portion of said calcination chamber to direct preheated raw material therein in a downward direction into said annular mixing zone to provide substantially and intimate mixing of said preheated raw material and fuel in said annular mixing zone such that oxygen-containing gas being passed upwardly through said adjustably positioned pipe and into said calcination chamber entrains and contacts the intimately mixed preheated raw material particles and fuel overflowing the weir to provide at least a partial substantial isothermal calcination of said raw material particles by the contact of the uniformly mixed preheated raw material and fuel with the oxygen-containing gas.

* * * * *

UNITED STATES PATENT AND TRADEMARK OFFICE
CERTIFICATE OF CORRECTION

PATENT NO. : 4,059,392
DATED : November 22, 1977
INVENTOR(S) : Jørn Touborg

It is certified that error appears in the above-identified patent and that said Letters Patent are hereby corrected as shown below:

At Col. 2, line 9, "then" should read -- thus --.

At Col. 10, lines 23-24, delete "as the edge 11 fluidising gas are shown,".

At Col. 16, lines 9-10, delete "and a lower end portion connected to a particle/gas separator".

Signed and Sealed this

Ninth Day of May 1978

[SEAL]

Attest:

RUTH C. MASON
Attesting Officer

LUTRELLE F. PARKER
Acting Commissioner of Patents and Trademarks